Feb. 27, 1940. J. A. H. BARKEIJ 2,191,745
INTERNAL COMBUSTION ENGINE
Filed March 31, 1934 6 Sheets-Sheet 1
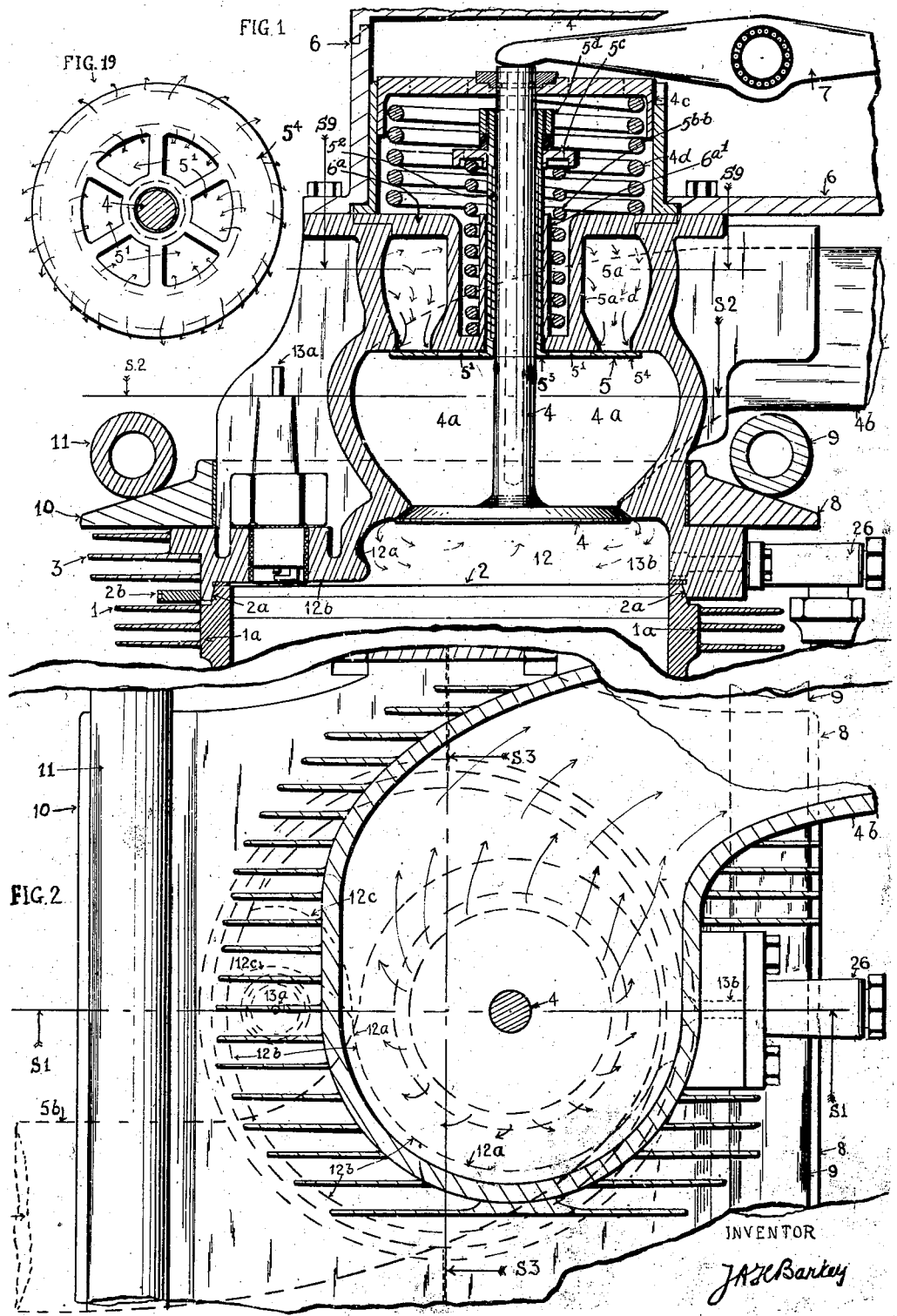
INVENTOR
J.A.H.Barkeij

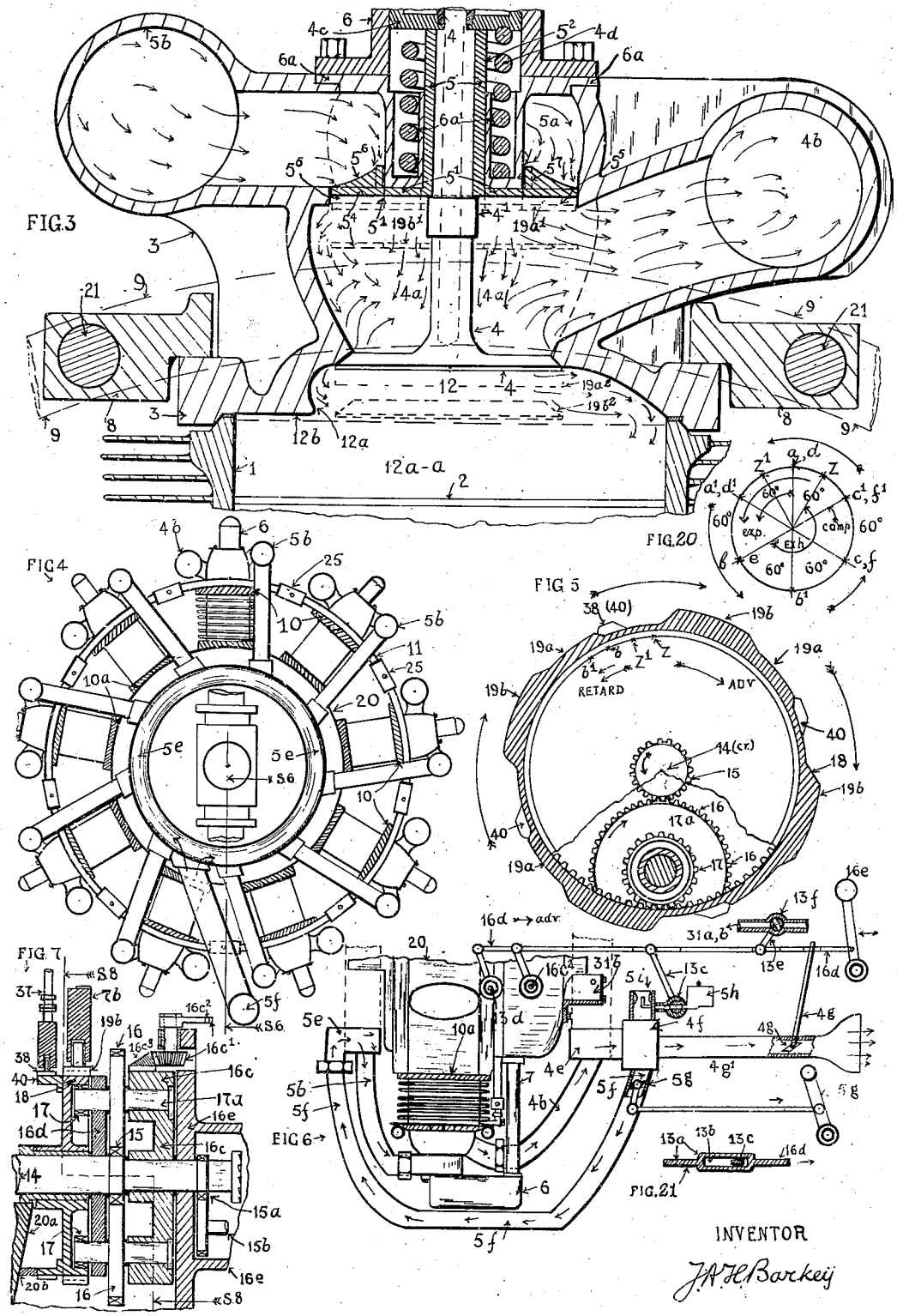

Feb. 27, 1940.　　　　J. A. H. BARKEIJ　　　　2,191,745
INTERNAL COMBUSTION ENGINE
Filed March 31, 1934　　　6 Sheets-Sheet 3

INVENTOR
J.A.H.Barkeij

Feb. 27, 1940. J. A. H. BARKEIJ 2,191,745
INTERNAL COMBUSTION ENGINE
Filed March 31, 1934   6 Sheets-Sheet 4
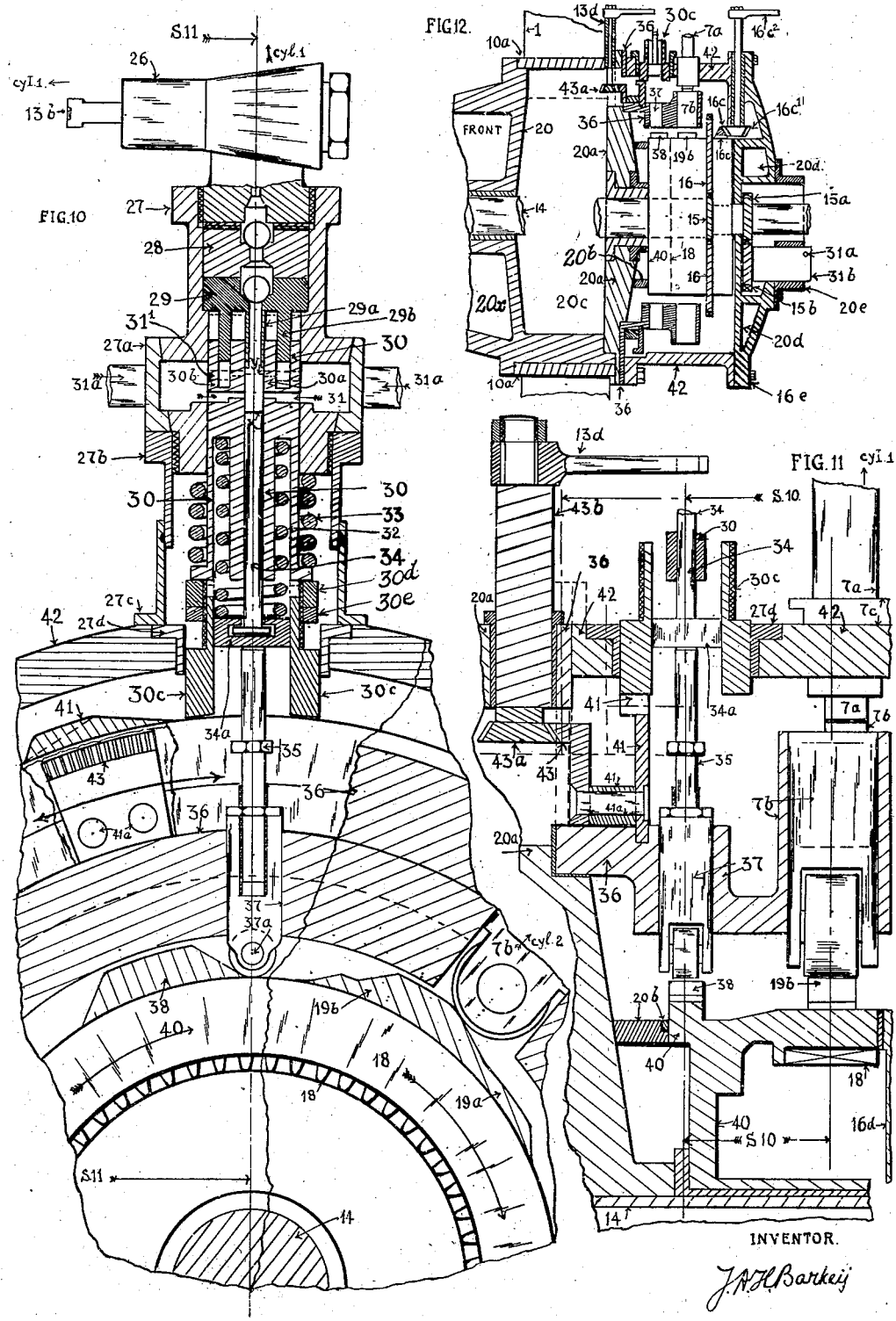
INVENTOR.
J.A.H.Barkeij

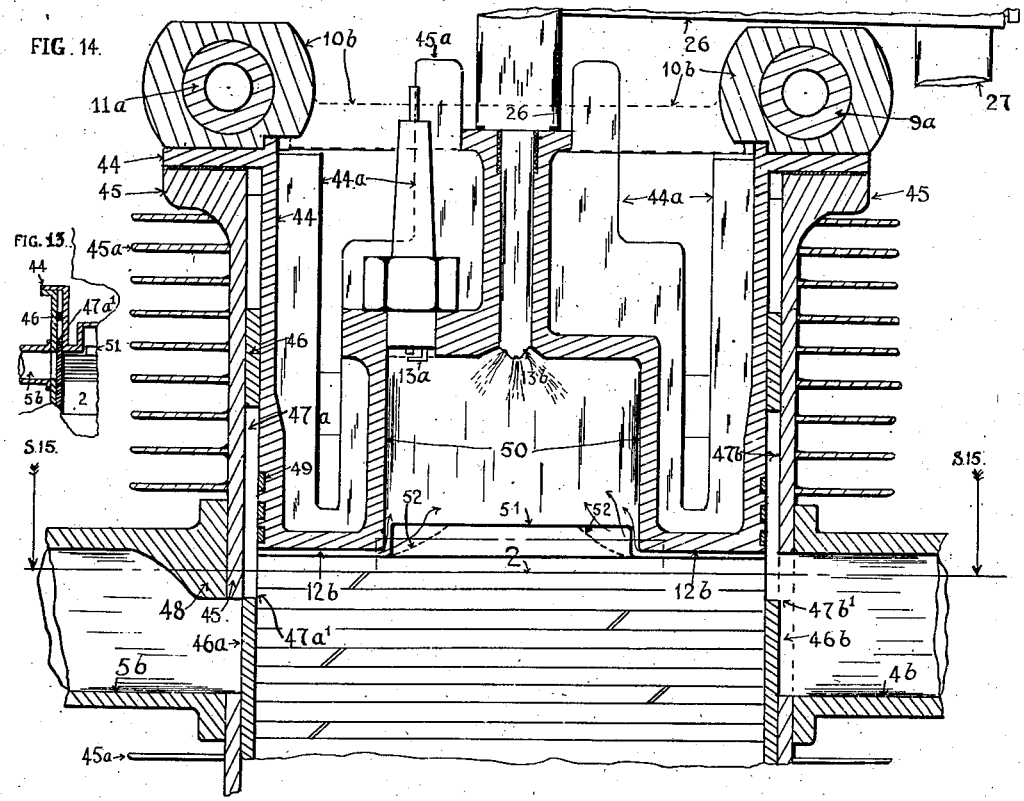
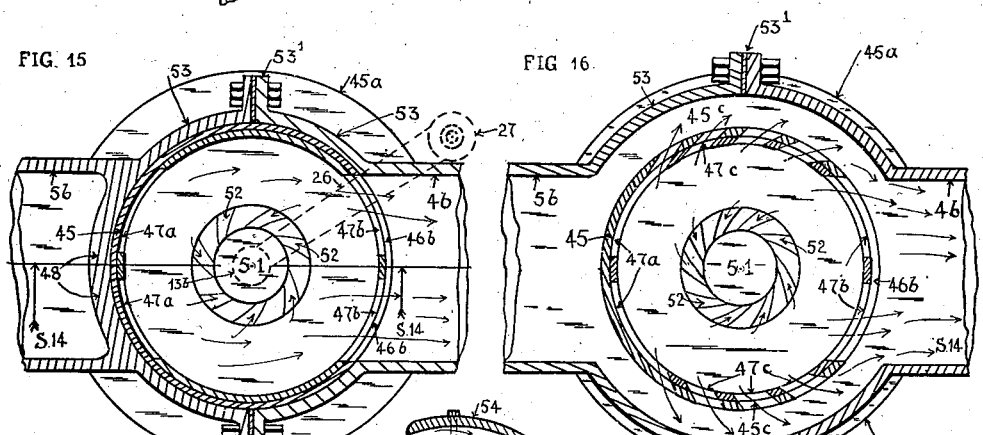
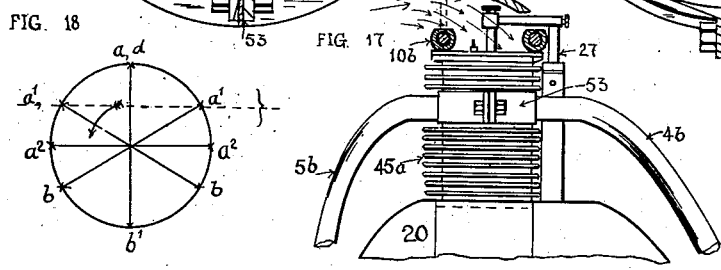

Feb. 27, 1940. J. A. H. BARKEIJ 2,191,745
INTERNAL COMBUSTION ENGINE
Filed March 31, 1934 6 Sheets-Sheet 6

INVENTOR
J.A.H.Barkeij

Patented Feb. 27, 1940

2,191,745

UNITED STATES PATENT OFFICE 2,191,745

INTERNAL COMBUSTION ENGINE

Jean A. H. Barkeij, Altadena, Calif.

Application March 31, 1934, Serial No. 718,420

14 Claims. (Cl. 123—79)

The present invention continues the construction disclosed in my application No. 447,520 filed April 26, 1930, in which a single valve controls the exhaust and inlet period of the fourstroke cycle of an internal combustion engine. It continues further means to vary the timing of said valve during the running of the engine.

It contains further the subject matter of my application No. 18,481 of April 26, 1935, to run the same engine part of the time on the Otto cycle and part of the time on the Diesel cycle.

The subject matter of this application is further continued in my application No. 18,481 of April 26, 1935.

My first object is to construct a new and improved valve actuating gear and valve lifting construction for the radial type of engine.

My second object is to combine said valves' arrangement with a construction whereby the timing of said valves may be varied during the running of the engine, when starting, and when the engine does not run. The principle of this mechanism is fully equivalent to that shown in my application No. 447,520.

My third object is to run the same engine part of the time on the Otto cycle and part of the time of the Diesel cycle. With the Otto cycle is meant a cycle in which the air and fuel as a fairly homogeneous mixture are introduced into the cylinders simultaneously along the same path. With the Diesel cycle is meant a cycle in which the air and fuel are not introduced simultaneously into the cylinders and are introduced along entirely different paths, and at different times.

Therefore it is logical to include under the name Diesel cycle, any engine in which the fuel is injected solidly into the air mass in the cylinder. Whether this injection happens substantially at the end of the compression period to cause the actual ignition of the fuel, the so-called true Diesel cycle, or whether this injection of fuel takes place substantially before the final compression to be ignited by spark ignition means, is immaterial to said distinction.

The latter cycle is sometimes called the Hesselman cycle, and applicant referred to this cycle already in his application No. 688,167 of September 5, 1933, Figs. 1 to 13, and refers in the same way to this cycle in his application No. 18,481 of April 26, 1935. In all these applications it is considered that the only sharp distinction between the Otto cycle and the said Diesel cycle (including the true Diesel cycle and the Hesselman cycle), lies in the timing and manner and place of mixing the two fundamentals of any combustible mixture, the air and the fuel. It stands to reason, in this application, like in those mentioned, that it takes very little change, retaining thereby the essentials of the inventions to be patented in said applications, to convert the true Diesel cycle in said engines to the Hesselman cycle, when an injector and a sparkplug are placed in certain preferred positions as shown. Only the timing has to be changed of the fuel injection and the degree of compression. Where in these two applications, this and No. 18,481, and in No. 688,167, the said compression can be varied within rather wide limits, it stands to reason that applicant may consider both cycles, the true Diesel and the Hesselman cycles as applicable with the mechanism shown and explained. The true Diesel cycle operates with a final mechanical compression of 12 atmospheres and higher, while the Hesselman cycle operates with compression slightly higher than those (4 to 6 or 7 atmospheres), which can be used in explosive cycles, due to the fact that the fuel is injected slightly before (about 70° to 50° before top dead center position of piston) the final state of compression, where spark ignition takes place about 30° to 10° before the piston reaches top dead center, like in the standard explosive engine.

In the present engine the high compression for the true Diesel cycle is shown in Fig. 1, where the piston reaches almost the undersurface of the cylinderhead as shown at 12b.

In the present engine the low-compression Diesel type is shown in Fig. 3, where the piston 2 does not reach the undersurface of the cylinderhead 12b when in top dead center position.

However, in both types it is also considered that the construction 12a of Figs. 1 and 3 may be applied equally on both types and also, of course, on the type of engine having a separate valve for inlet and for exhaust. It stands to reason that my arrangement to cause a violent swirl of the incoming air charge to reach and maintain a turbulence in the combustion chamber of Figs. 1 or 3, in order to cause a proper mixing of air and fuel for the true Diesel cycle and the Hesselman cycle, may be equally applied on a single or multiple inlet valve. One of my objects is to cause said turbulence during the inlet period of the air, and said turbulence is so essential to both of said cycles mentioned, the Diesel and Hesselman cycle, that it is evident that these two cycles may be applied on the same engine.

My fourth object is to lift the single main poppet valve initially during the beginning of the exhaust period, and to lift said valve further during the end of this period. This poppet valve controls the exhaust and inlet period at the top end of the cylinder. Equally so in the sleeve valve type, a construction is shown in which the exhaust starts only at first at one side of a single sleeve before the inlet side of this sleeve is opened.

My fifth object is to connect the individual inlet conduits to a ring-manifold in front of the engine, and to lead a single pipe from said manifold to the rear of said engine towards a ring-manifold for the individual exhaust conduits of said same cylinders, for the purpose of heating the mixture of air and fuel (or only the air-charge) by means of the exhaust gases. Each of the said ring-manifolds connect with a single conduit rearwardly, each of which conduits may be provided with a throttle to restrict the entry of air, or the exhaust of burned gases, respectively. (Figs. 4 and 6.)

My sixth object is to construct the underside of the cylinder-head in such a way that the air-charge is given a whirling movement around the axis of the cylinder by the shape of the undersurface of said head around the underside of said main valve.

My seventh object is to operate said engine during starting and slow running by means of spark ignition, then during higher speeds only compression ignition may be used. The variation of the timing of said main valve and said fuel-injection taking place simultaneously.

Other objects appear in the description, and variations not deviating from the features and principles explained herein are included within the scope of this application.

I effect the said various objects by means of a mechanism described hereinafter in connection with the following drawings (which omit various small, insignificant, well-known details of design for clearness).

Fig. 1 is a vertical sectional view of the top end of a cylinder and cylinder-head, containing an exhaust and inlet passage and two concentric valves. Fig. 2 is Fig. 1 on the section line 1—1.

Fig. 2 is a horizontal sectional view of Fig. 1 on the section line S2—S2, showing the fuel injector to the right and the spark-plug to the left.

Fig. 3 is a vertical sectional view of the top end of a cylinder and a cylinder-head, showing another type of compound valve, the main valve thereof being an exhaust-inlet valve. This valve is constructed differently from Fig. 1, but the general arrangement of the inlet and exhaust passage in an 8 shape is the same. This shape can be seen either in Fig. 2, or in Fig. 23 following. A side view on the outside of said construction can be seen in Fig. 24, and Fig. 4.

Fig. 4 is a front view of a radial nine cylinder engine, using the manifolding arrangements for said Fig. 3 or Fig. 2.

Fig. 5 shows the camshaft and its drive in vertical section at 90° to the crankshaft axis.

Fig. 6 shows Fig. 4 on the section line S6—S6, showing the arrangement of the inlet and exhaust manifold together with the controls of the engine.

Fig. 7 shows a vertical cross-section of the mechanism to drive the cam-shaft of Fig. 5 from the crank-shaft, and of the mechanism to vary the timing thereof. Fig. 7 shows Fig. 8 on the section line S7—S7.

Figure 8:
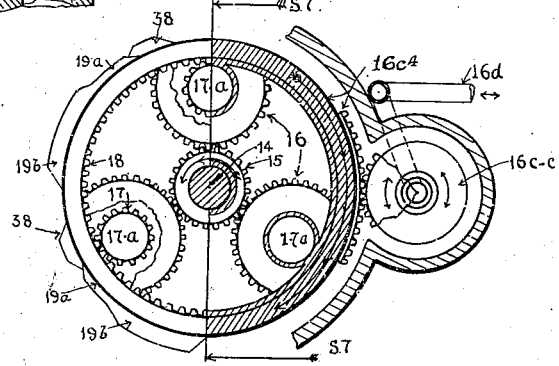

Fig. 8 shows Fig. 7 on the section line S8—S8 thereof with the exception of the bevel gear $16c^3$ on the spider plate $16c$, and the bevel gear $16c^1$ and handle or arm $16c^2$. These bevel gears are displaced in Fig. 8 by a spur gear $16c^4$ and a spur gear $16c$—$c$.

Figure 9:
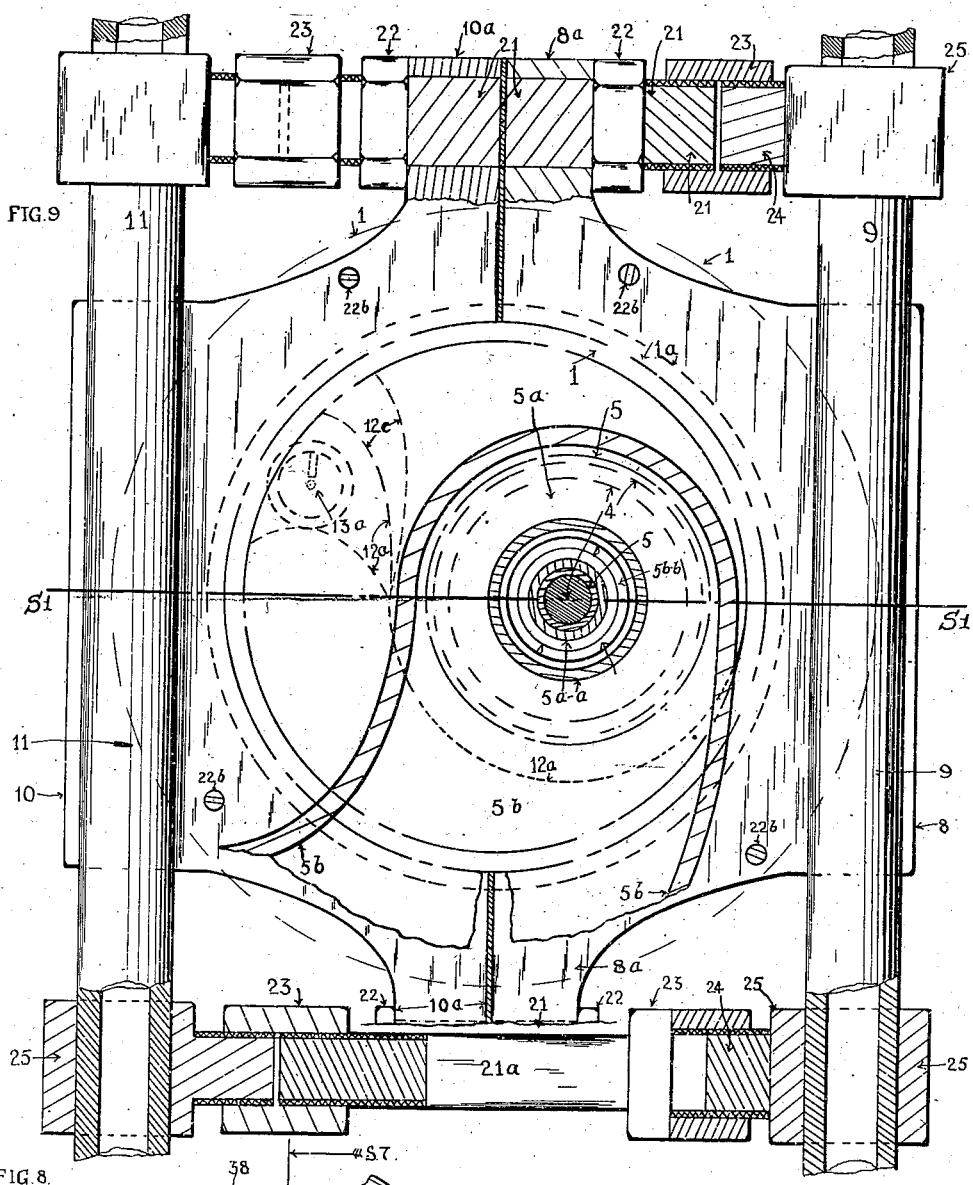

Fig. 9 shows a horizontal section of the inlet passage in the cylinder-head.

Fig. 10 shows an improved type of fuel pump, in which the quantity of fuel injected is not regulated by the stroke of the piston of the fuel pump, but by a new construction to be explained hereinafter.

Fig. 11 shows the construction of the valve gear to drive the fuel pump of Fig. 10 at right angles thereto on the section line 11—11 of Fig. 10. It shows in Fig. 11 only the lower part of Fig. 10, that which is below the upper part of Fig. 10, showing the fuel-pump construction proper.

Fig. 12 shows the general arrangement of the mechanism to lift the valves and to drive the fuel pumps shown in Fig. 10 and will be first discussed in detail, before describing the parts of the other figures.

Fig. 13 shows a modification of the left port of the cylinder and sleeve of the construction shown in the following Figure 14.

Figs. 14–18 show a modification for the sleeve valve type, as applied to this engine.

Fig. 14 shows a vertical cross-section of the top end of a cylinder and its cylinder-head of a sleeve valve engine. Fig. 13 shows a modification of Fig. 14 concerning the inlet side of said cylinder and sleeve shown in Fig. 14.

Fig. 15 is a horizontal section of Fig. 14 on the section line S15—S15 of Fig. 14, Fig. 14 being Fig. 15 on the section 14—14 thereof.

Fig. 16 is a modification of the arrangement of Figs. 14 and 15.

Fig. 17 is a side view of the arrangement of Figs. 14–15 or 16.

Fig. 18 is a diagram explaining the operation of the engine of Figs. 14, 15 and 16.

Fig. 19 on Sheet 1 shows the inlet valve 5 of Fig. 1 in horizontal elevation and is a top view of said auxiliary or complementary valve of Fig. 1.

Fig. 20 shows a diagram for the retarding and advancing of the timing of this cam shown in Fig. 5 in relation to the piston positions during a four-stroke cycle.

Fig. 21 shows a lost motion mechanism connected with the throttles of the engine.

Figure 22:
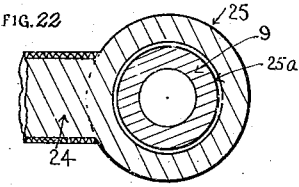

Fig. 22 shows a mechanical detail of Fig. 9.

Figure 23:
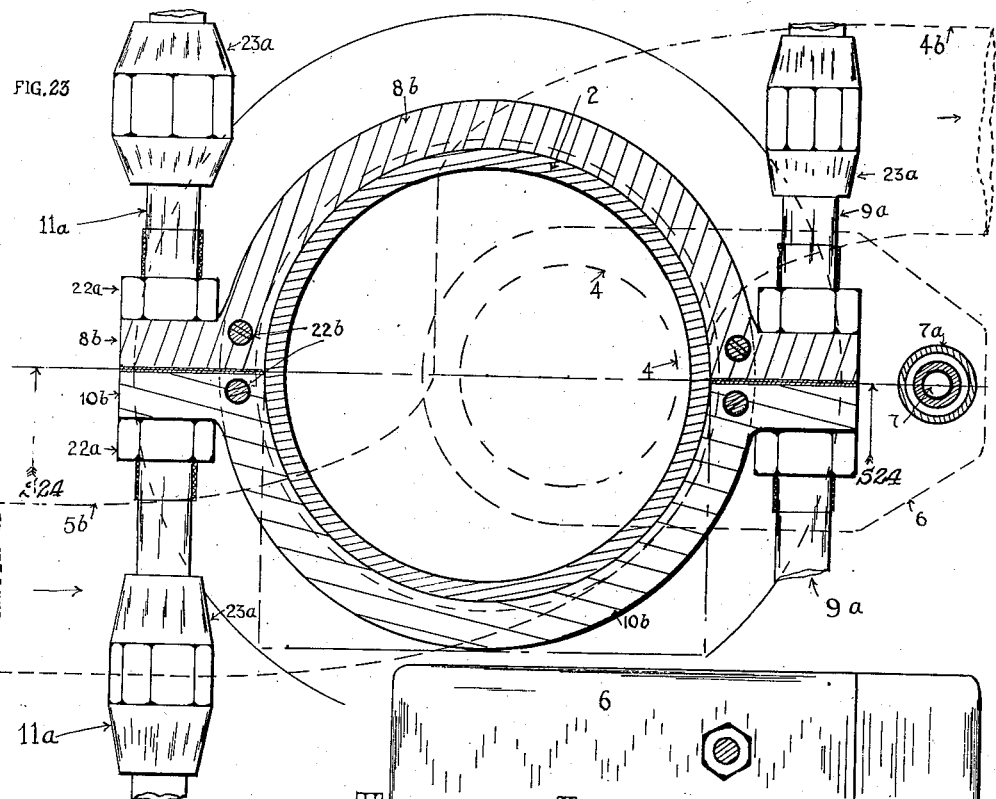

Fig. 23 shows in horizontal section the top end of the cylinder and shows in dotted lines, indicated by the numbers 5b and 4b the general 8 form of the inlet conduit and the exhaust conduit in relation to the valve 4 (and 5) of Figs. 1 or 3.

Figure 24:
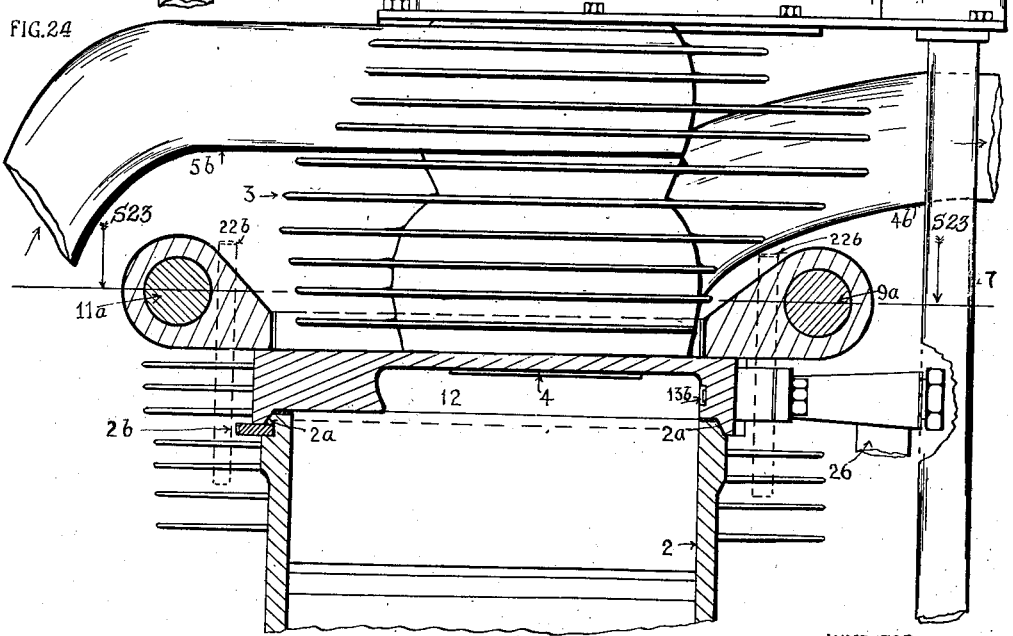

Fig. 24 shows a side view of the inlet and exhaust conduits from the outside.

Describing the figures now in detail, I begin with Figs. 12, 11, and 7. Then I return to Figs. 1 and 2, Figs. 5 and 20, Figs. 4 and 6, and Fig. 10. Then I return to Fig. 12 in connection with Figs. 11, 7 and 6 explaining the operation of the engine. Thereafter I will explain the modifications of Figs. 3, 8, 22, 23 and 24, 14–18, and Fig. 13 showing a modification of Fig. 14.

Figs. 12, 11 and 7 show the central part of the whole engine in vertical, longitudinal and transverse cross-section through the axis of the crankshaft. The front part of the engine, $20x$, may contain additional mechanism. The intermediate part $20c$ is the crank-case proper, covered to the right with a plate $20a$. Upon this plate $20a$ fits another annular tappet plate or tappet ring $36$ in which are arranged the guides or tappet holes for the push-rods or tappets $37$ of the pistons 34 of the fuel pumps, and the guides or tappet holes 7b for the push-rods or tappets for the main valves. The cam-shaft 40 carries four cams 38 for the tappets 37 for the fuel pumps and four cams 19b for the tappets 7b, for the valves 4, and said cams are respectively under these push-rods guides or tappet holes, and aligned therewith. A part of this annular cam shaft 40 is shown in section and enlarged in Fig. 11. The annular inside gear is also indicated by the number 18.

Further to the right in Figs. 12 and 17 are the gear-wheels 16, and the mechanism 16c to vary the timing of this camshaft 40 simultaneously by means of a simple mechanism to be described later in connection also with Figs. 5, 7 and 8. Two gear-wheels 16 are shown in Figs. 12 and 7, but a single one as shown in Fig. 5 will suffice for the drive and variation of timing. The epicyclic, planetary, or satellite gears 16 in Fig. 7 have a bearing in two discs, one to the left 16d, and one to the right 16c in Fig. 7, which are held stationary by the gears 16c and 16c¹. The gears 16 are geared to the sun-gear 15 fixed on the crank-shaft 14.

The rear-part 20d in Fig. 12 forms an oil reservoir for the engine. Part of this space is occupied by a low pressure fuel pump 31b having an outlet 31a to feed oil to the high pressure pumps 27 of Fig. 10, at the inlets 31a thereof.

In the cover-plate 20a and annular tappet ring 36, is cut away a circle-sector to make room for the bevel gears 43, 43a as shown in Fig. 11 to vary the quantity delivered by the fuel-pumps without changing the actual stroke of the piston of these fuel-pumps, as will be explained later when referring to Figs. 11 and 12 in particular.

The cover-plate 20a and annular tappet ring 36 clamp a guide 43b for the bevel gear 43a, geared to said bevel gear 43a connected to a bracket (having the same number 43, forming a single unit therewith) carrying a ring 41, with nine cams (also numbered 41 as forming a single unit therewith), rotatable on the tappet-guide ring 36, and casing 42 holds the guides 27d for the fuel pumps. The outer (see Fig. 11) guides 7c for the push-rods 7a for the valves 4 are likewise pressed into the cover-plate 42. The low pressure pump for Diesel fuel 31b (see Fig. 12) is driven by gears 15a, 15b directly from the crank-shaft, and is attached to the crank-case or cover-plate 20d in any convenient way, (by bracket 20e).

On the annular tappet ring 36 (see Fig. 11) is arranged an annular ring 41 having on its periphery nine cams 41 which operate upon a part 30c of the fuel pump to vary the quantity of fuel injected.

To this ring 41 is attached said bracket 43 by bolts 41a. This bracket is provided with a bevel gear (also indicated by 43 forming a single unit therewith, see Figs. 10 and 11), (part of a circle), upon which operates a small bevel gear 43a on a vertical shaft 43b rotated by lever 13d. By rotating the lever 13d this ring 41 is rotated on the tappet guide 36, which is constructed as a separate unit from the engine casing (see Fig. 11).

Returning to Fig. 7, a sun-gear 15 is fixed on the crank-shaft 14. This sun-gear drives the planetary gears 16, having at the left end a gear 17 geared to the internal annular gear 18 (see also Fig. 11, this gear 18 enlarged). The gears 16 have, as explained, a bearing to the left in the spider-plate 16d and to the right in the spider-plate 16c. This latter plate has at its periphery a bevel gear 16c⁴ (part of a circle) which engages a small bevel gear 16c¹ operated by lever 16c². When this lever 16c² is rotated the planetary gears 16 are rotated with respect to the sun-gear 15 and it moves therefore the cam-shaft, advancing and retarding the timing of the fuel pumps and the lifting of the main valves, as will be explained more particularly in connection with Fig. 5 and Fig. 20.

A particular feature of the valve lifting mechanism is the shelf 20b on the crank-case casing, forming an integral part therewith by preference, as shown in Fig. 12 and enlarged in Fig. 11. This shelf 20b, attached to the crank-case by means of bolts and/or screws not shown, may be provided with an anti-friction-bearing-material as shown. This material may be a ring and can be pressed upon this shelf or attached thereon in any convenient way. The cam shaft 40 has a bearing on the crank-shaft 14 as shown in Figs. 7 and 11, but is at the same time backed by the shelf 20b. The lifting of the fuel-pump pistons by the cams 38 and the lifting of the valves 4 by the cams 19b and tappets 7b cannot be made too accurate. Besides the cumulative effect of wear on its main bearing on shaft 14 is prevented and reduced appreciably by this back, if not entirely eliminated thereby for the life of the other parts of the engine, and this feature is therefore considered to be a very important detail of the radial type engine in general. In connection therewith it is of equal importance to make the annular tappet guide 36 separate from the crank-case so that this part can be forged accurately and separately from the crank-case casing.

The unit of the camshaft 40 (carrying cams 38 and 19b) and tappet guide 36 can be built and tested separately from the main engine before it is attached thereto. The tappet guide 36 may be drilled with holes all around for the tappets 37 and 7b, together with the holes drilled near the periphery thereof to be attached to the right part of the crank-case (see Fig. 12), as shown, or the guide 36 may be attached to the right part of the crank-case with separate bolts, separate from the casing 42 (see Fig. 12), according to the space left available in a given design.

(Fig. 8 shows a variation of the mechanism to vary the timing, only so far as to rotation of the disc 16c is concerned and will be explained later at the end of this specification.)

I now return to Figs. 1 and 2.

In Figs. 1 and 2, 1 is the cylinder, 3 the cylinder-head, 2 the piston reciprocating in said cylinder. 4 is the main valve controlling the exhaust and inlet of gases, and closing the cylinder during the compression and explosion period. This valve remains open approximately 450°–490°, and closed about 270°–230°. 5 is an additional or supplementary valve concentric with the main valve to prevent the exhaust gases from reaching the inlet manifold or carburetor directly. 4a is the chamber between these two valves, 4b the exhaust manifold connecting with chamber 4a. 5a is the chamber above the valve 5 connecting with the inlet conduit 5b. Both of said chambers have been given the form of a frustrum of a cone, funnel-shaped, or Venturi-shaped, in order to accelerate the speed of the gases through said venturi where the inlet valve is located. In both chambers 5a and 4a the valve has been placed substantially at the narrowest part of the venturi, so that when the valve opens the kinetic energy of the charge is greatly increased where the inlet valve forms a passage towards the cylinder. Of course, the form of this chamber may be varied, shortened or lengthened according to design, but the length of the flaring end of the venturi cannot be made too short, the angle thereof being closely related to the length thereof as is well known in the fluid art. But in so far as in this construction the valve, when opening and when entirely opened, provides an impediment to the incoming charge as compared with the standard open Venturi passage, the angle may have to be more than that of the open Venturi passage to effect a high coefficient of discharge. The valve 4 being also an exhaust valve, the exhaust is accelerated through said passage also, because the recess 12 and rim 12a form more or less a Venturi passage also especially at the end of the stroke when the piston approaches the undersurface of the cylinder-head. 4c is the spring rest for valve 4 and 5c for valve 5. 4d is the heavy spring for valve 4, and 5d is a stop or tappet between the spring rest for the main valve and that (5c) of the supplementary valve. 5b—b is the spring below the spring rest 5c of valve 5.

6 is the housing for the lifting mechanism as is well known in the art. For the present construction, however, it is preferred to anchor the rocking lever 7 to the right of the valve and to guide said valves 4 and 5 in the valve-guide or bearing 6a¹ in the housing or cup 6a.

12 is the combustion space in the cylinder-head below the valve 4, the rest of the undersurface of the head being approached closely by the piston in top position as shown at 12b in Fig. 1, and the edge 12a being located between the raised portion around the valve 4 and the said lower portion 12b. Edge 12a is curved to direct the exhaust gases towards conduit 4b during the exhaust period and to whirl the inlet gases in the cylinder itself during the inlet period to be continued during the compression period and fuel injection period, be this latter period during the final compression stage or before the final stage of said period is reached, as explained before.

13a is the spark-plug placed by preference either in said lower portion 12b (or slightly before it, as shown in Fig. 9), about in the area where the higher portion gradually slopes down to the lower portion of 12b, as indicated by dotted lines 12c in Fig. 2 to the left of valve 4. 13b is the fuel injector or pulverizer, which is placed by preference at the back of the cylinder, to the right in Fig. 1 where the push-rod for the valve 4 is located.

The valve 5 is made as light as possible by means of a central aperture 5¹ (see Fig. 19), and a very light stem 5², the inside of which serves as a bearing for the total surface of the stem of valve 4. The central part of valve 5, 5³ rests normally against the underside of the cup 6a located in the center of chamber 5a, and the outer rim 5⁴ of valve 5 rests partly also on said cup 6a and partly upon the wall of said chamber 5a.

The edge 12a should be curved towards the valve 4 in order to give the incoming charge a rotary motion around the cylinder axis, in addition to the turbulence created by the piston when approaching the lower part 12b of the cylinder-head 3. I skip the description of Fig. 3 and continue with Figs. 20 and 5.

Fig. 20 shows diagrammatically the timing of the single valve in relation to the approximate piston position. The engine rotates counter-clockwise and firing occurs when the piston is about at a, exhaust starts about at b, and continues through c to point d, when the inlet period starts, which continues to about 45° to 60° after bottom position to point f after the bottom position b¹. It is therefore supposed that the semi-automatic inlet valve 5 of Fig. 1 is capable of staying open under the pressure of the inrushing air and the inertia of the exhaust gases streaming away from the cylinder to the atmosphere. As described before, the hollow stem of the valve 5 has a smooth sliding surface on the stem of the valve 4 and on the inside of the valve guide 6a¹. This valve is called appropriately semi-automatic because the opening is done forcibly like the opening of valve 4, but the closing is virtually not forcibly, because the spring 5b—b of valve 5 is considerably lighter than the spring 4d of the valve 4. Compression takes place from f to the firing point a. It is understood that the spark ignition normally occurs before this point and that in the Diesel cycle the injection begins also substantially before that point. In the Hesselman cycle, the injection takes place substantially 70° to 50° before top dead center position of the piston, while the spark ignition occurs about the same time as in the explosive engine, as explained before. The crank-shaft rotates counter-clockwise, but the annular cam shaft 40 in Figs. 11 and 12 rotates clockwise as shown in Fig. 5.

When retarding the timing by means of the mechanism already explained in connection with Figs. 7, (8), 10, and 11, the exhaust valve may open when the piston is about in bottom position at point b¹, and the same valve 4 closes after about 480° (360°+120° after bottom position) when the piston is about at point f¹. Similarly the point of fuel injection can be retarded from point z to point z¹, if it were not cut off entirely as we will see later when discussing the operation of the engine and Fig. 10 in particular, showing the fuel pump. When interpreting the Figures 5 and 20 properly, it has to be remembered that crank-shaft and cam-shaft move in opposite directions. (That means that retarding in Fig. 20 is in clockwise direction, and counter-clockwise in Fig. 5.)

In Fig. 4 is shown a 9-cylinder radial engine in front view. The inlet conduits are in front of the engine; the exhaust conduits are directed towards the rear. The housing for the valve rockers is indicated by the number 6. This arrangement of the manifold is proposed to keep the cylinders as cool as possible, though any other arrangement may be applied.

The inlet conduits of the individual cylinders extend in front of the cylinders towards a ring-manifold 5e, from which extends a single large conduit 5f towards the rear of the engine, as can be seen in Fig. 6, which is Fig. 4 on the vertical section line 6—6. Fig. 6 shows only the lower part of Fig. 4 at right angles thereto.

In Fig. 6 it can be seen that the individual exhaust conduits extend (by preference back of the cylinders) towards a similar ring manifold 4e (supposed to be arranged at the back of the engine in the same way as the inlet manifold 5e is arranged in front of the engine as shown in Fig. 4), which has a single large conduit 4g¹ extending rearwardly towards the atmosphere. The said inlet conduit 5f may find a hot spot 4f somewhere on the exhaust conduit, and fuel mixing means 5h may be provided at the entrance 5i of said inlet conduit. This hot spot should be in close proximity to the carbureting means, so that it is located as a down-draft carburetor above said hot spot. In both of said single-end conduits is constructed a throttle 5g in conduit 5f and 4g in conduit 4g¹, both of which may be controlled independently of each other. The throttle 5g for the inlet conduit is by preference below the said hot spot, which is therefore located between the throttle and fuel mixing means. It is, of course, understood that if up-draft carburetion is used, that said hot spot should be equally constructed between the carburetor and the throttle, or in other words, the throttle should be between the inlet valve of the cylinders and said hot spot. The advantage of this construction is that the heat of this hot spot cannot expand the mixture between said inlet valves and said hot spot, as the throttle is between them. This arrangement is of particular value at lower speeds when the throttle is part closed, as the vacuum in the manifold is high. At higher speeds the rush of the air or mixture is fast enough to prevent any undue or objectionable expansion between carbureting means and throttle, and at lower speeds the air or mixture crowds around the hot spot at about atmospheric pressure, while if the hot spot was between inlet valves and throttle, the pressure about the hot spot would be sub-atmospheric in the inlet manifold at varying speeds. This feature could be equally applied on automobile engines and stationary engines. The amount of air for Diesel cycle or Hesselman cycle operation to be admitted to the cylinders is by preference controlled from and connected with the inlet manifold throttle 5g, as this inlet has to be regulated already by a throttle to regulate the amount and quality of the gas mixture when the engine is operated as an explosive type, when starting, and eventually when keeping the engine warm at speeds at which the quantities of Diesel fuel to be injected become too small to be regulated efficiently and accurately.

In the same figure is shown a link-rod 16d connecting the levers 13d, regulating the quantity of stroke of the fuel pumps, with the lever 16c², regulating the timing of the cylinder-valves and the timing of the fuel injection. This link-rod is also connected with the lever 13c shutting off the gasoline (or benzol) at a certain moment of timing of lever 16c², and also connected with the lever 13e admitting Diesel fuel to the pumps 26 at 31a, Fig. 10. The two latter levers, 13c and 13e, may be hooked up with the link rod 16d and the main regulating control hand lever 16e directly or in such a way that a lost motion is inserted between the two as shown in Fig. 21. This linkage without said lost motion mechanism operates so that in extreme left position of handle 16e, gasoline is admitted and in reverse direction in an extreme right position (most advanced timing) Diesel fuel is admitted. If said lost motion linkage is inserted (see Fig. 21), and the link rod 16d moves from an extreme left position to the right, a certain amount of lean mixture may be still admitted, together with a certain amount of Diesel fuel by the Diesel fuel pumps of Fig. 10. When the link rod 16d reaches an extreme right position, all gasoline is cut off and only Diesel fuel is admitted. Returning from pure Diesel fuel to pure gasoline fuel, this same intermittent period of part gasoline mixture and part Diesel fuel will be passed. To explain this we have to see Fig. 21, wherein 13a is a loop in the link rod 16d; in said loop is inserted the arm 13c controlling the amount of gasoline to the fuel mixing means. When the arm 13c is located at the point indicated by 13b in Fig. 21, the link rod 16d being in extreme left position, the entire passage is open. When the link rod 16d moves to the right at first, it does not move the arm 13c, being at point 13b and then it begins to throttle the passage of the gasoline or benzol or alcohol when the left end 13a of the loop approaches point 13b. When the link rod moves more and moves arm 13c to the point in which it is shown in Fig. 21 at 13c, the left part of the loop is against arm 13c and moves said arm 13c further to the right and all gasoline is gradually shut off and the timing of the valves and fuel injection pumps can be still advanced after the gasoline is entirely shut off until lever 16e reaches extreme right position. In which case the lever 13c will be at the place indicated by 13b in Fig. 21. When the lever 16e is moved to the left, the loop 13a initially does not move the lever 13c until it reaches the position shown in Fig. 21. The lever 16e begins to admit a little of benzol or gasoline and begins to shut off the Diesel fuel, by moving lever 13e in the same way as lever 13c, and when the lever 13e has shut off the Diesel fuel entirely, the lever 13c opens up the full amount of gasoline. In the drawings is only shown diagrammatically the fundamental arrangement of such a modification with lost motion linkage operating directly upon the passage between the float-chamber 5h and the jets of the fuel mixing means, but it is of course supposed that the lever 13c may be operated upon any butterfly or any jet of any carburetor arrangement suitable for this fundamental arrangement. Likewise in Fig. 6 is shown that the lever 13e operates upon throttle 13f between the low pressure pump 31b (see Fig. 12) and the high pressure pumps of Fig. 10, but this lever 13e may equally be made to operate directly (eliminating cock 13f) on the lever 13d controlling directly the high-pressure-fuel pump 27 by cam 41, regulating the amount of fuel injected by the said high pressure pumps and cutting off all fuel when moved to the left in Fig. 6. Various modifications can be readily conceived within the scope of said Figures 6 and 21, and these are understood to fall under the scope thereof, as soon as the alternative Otto and Diesel cycle is controlled by one and the same lever, and by a linkage 16d and 16e.

By a lean mixture is meant a fuel-air mixture of which the ratio of hydro-carbon of unit-weight, and air of unit-weight is considerably greater than 16 to 1. Maximum power is obtained with fuel-air mixtures at a ratio of about 14.3 to 1 and 12.4 to 1. The leaner the mixture becomes the slower the combustion starts and finishes. The carburetor has to be set so that the compression obtained by various positions of the lever 16e does not cause pre-ignition of the mixture charge before Diesel-fuel injection starts by the pumps. This depends upon the kind of fuel used for the Otto cycle.

The ignition of said lean mixtures is either initiated by the spark-ignition or by the Diesel-fuel-ignition, depending upon the timing obtained by lever 16e. Ignition by spark and injection may occur simultaneously or substantially separated as explained for the Hesselman cycle.

Before explaining the operation of the entire engine, it is preferred to explain the high-pressure fuel pumps to vary the quantity of fuel injected, in connection with Fig. 10. In Fig. 10 is shown the fuel pump, consisting of a nozzle-body 26, an upper barrel or pump-cylinder 27, an intermediate flange 27a to fasten the fuel line 31a to the pump body, a lower nut and cover-shield 27b, and a shield 27c resting on the guide 27d for the by-pass sleeve-valves 30, 30d, 30e, 30c of the pump, in the cover plate 42. The upper barrel contains the foot of the nozzle, an intermediate part 28, with a ball valve opening upwardly, a second intermediate part 29, with a ball valve and two annular rings extending downwardly, the inner one 29a being very thin, the outer one 29b being heavier. These ball valves are not imperative for an injection pump as such. These annular rings fit very snugly inside two other annular rings 30a and 30b on the upper end of the by-pass sleeve-valve 30, which contains centrally the main piston 34 with constant stroke.

In the by-pass sleeve-valve 30, immediately under the annular rings 30a and 30b is a fuel passage 31 (by preference four holes at right angles to each other), leading from the fuel pipes 31a to a point located about half way of the stroke of the inner piston 34, when the by-pass sleeve-valve 30 is at its lowest position. When the by-pass sleeve-valve is raised by the intermediate piston-push-rod 30c operated upon by the cam action 41, the fuel passage 31 will be located exactly above the point of the highest position of the inner piston 34, so that the fuel will be returned when piston or plunger 34 is rising to top position.

The by-pass sleeve-valve 30 is held down by a spring 33 considerably heavier than the spring 32 holding down the inner piston 34. The inner piston 34 has a seat in an auxiliary piston 34a, which slides also up and down in the lower end of the outer piston-push-rod 30c in the guide 27d, and is driven by the push-rod 35, having a bearing in a tappet 37 in the guide ring 36. This push-rod is composed at the upper end thereof of two adjustable nuts to regulate the height thereof (see 30d and 30e). 35 is lifted by a roller 37a and a cam 38 on said cam-shaft 40. Cam-shaft 40 has four cams 19b for lifting the cylinder-valves, as can be seen in Fig. 11, which is a vertical cross-section of Fig. 10 on the section line 11—11, and as can be seen in Fig. 5, and four cams 38 for lifting the said pistons 34 in the fuel-pumps.

We have seen in Fig. 11 that on the stationary guide or tappet ring 36 is located a rotatable ring 41 provided with cams 41 to vary the position of the auxiliary piston 30, in order to regulate the quantity of the constant stroke of the inner piston 34.

Fig. 10 shows that the cam-shaft 41 lifts the by-pass sleeve-valve 30 surrounding plungers 34 operating with a constant stroke. When this latter by-pass sleeve-valve 30 is raised and lowered by means of spring 33 and cam 41, the effective stroke of piston 34 is automatically and respectively decreased and increased. When X is the lowest position of the piston 34 and Y is the highest, and when the fuel passage 31 is raised from a point between X and Y to a point exactly below Y, it is evident that the quantity of fuel injected in the cylinders can be very accurately raised and lowered, and entirely eliminated by raising fuel passage 31 exactly above the position Y, as the fuel is pumped back in the main lines in which is very little pressure, created by the pumps 31b driven from the gear-wheel 15a, see Fig. 12.

The length of the cam 41 is made preferentially of a length equal to about 7.5° of the periphery of ring or cam-shaft, so that by rotating said ring that amount of degrees, the stroke of the piston 34 may effect an injection of a quantity of fuel of a minimum (or zero) to the maximum necessary for complete combustion of a complete air-charge to be obtained in the cylinder by said concentric valve arrangement of Fig. 3. I have shown on the cam further by a dotted line, a slope having approximately the same slant as the other slope, which raises the part 30c, 30e, 30d, and 30 forming the wall and chamber for the plunger 34. This slope has the purpose to decrease the quantity of injected fuel at high speeds, because the volumetric efficiency of any engine, having poppet valves or sleeve valves, decreases instead of increases at high speed. Therefore the quantity of air to be burned at high speed decreases, and the quantity of fuel injected has to be decreased proportionally at the higher or highest operating speeds by means of said slope going downwards in opposite direction. As explained this cam affects, the timing, the duration of the injection and quantity.

It is, of course, understood that any fuel may be injected by the injectors in said chambers 12 and 50. If a high compression is used the pressure has to be correspondingly high. If a low compression is used for gasoline injection, the pressure has to be comparatively low to prevent detonation and preignition.

Equally the disc or gearing 16c of Fig. 12 is by preference provided with a sector of a bevel gear. This disc or gearing 16c is connected with the driving mechanism 14, 15, 16, 17, 18, which reduces the rotation of cam-shaft 18 and 40 to ⅛ of the crank-shaft speed, as explained before, by which the timing of the valve-lifting and fuel-pump-reciprocation is advanced and retarded approximately 7.5°. In so far as these cams 38 and 19b on cam-shaft 40 rotate at such a slow speed, it is possible to vary the timing 60° of crank-shaft rotation by a mere rotation of the gear-ring 16c and 16c¹ (by means of mechanism 16c explained) of only 7.5° (approximately).

The arm 13d of the fuel-quantity-variation-mechanism is connected with the arm 16c² of the timing-variation-mechanism as shown and explained in Fig. 6, by means of linkrod 16d, which linkrod may shut off the gasoline by means of the arm 13c controlling the gasoline supply of the carburetor 5h, and may equally admit about simultaneously the Diesel oil to the pumps by operating the cock 13f by the arm 13e. In this case the arms 13c and 13e are connected directly to the main linkrod 16d without the mechanism of Fig. 21.

16e is the hand lever, which controls in the cockpit all of said mechanism in order to operate the engine first during the starting (and warming up) as an explosive engine and thereafter as a Diesel engine (see Fig. 6).

When pushing the lever 16e in Fig. 6 to the left 7.5°, the cams 41 in Fig. 10 are moved to the right clock-wise and raise pistons 30 so that the effective stroke of the pistons 34 is reduced to zero, as explained by pumping the fuel simply back to the main lines 31a. At the same time the cams 19b and 38 on cam-shaft 40 (see Fig. 5) are rotated counter-clockwise and are therefore retarded about 60°, so that according to the Figure 20 the exhaust period starts at point $b^1$, 60° removed from the point of normal operation b, that is, 60° before the bottom position of the pistons in the 9 cylinders, the gasoline is turned on by arm 13c, the fuel for Diesel operation is turned off, by arm 13e.

When pushing the lever 16e to the right, the cam 41 lowers the piston 34 by rotating the cam to the left, counter-clockwise thereby increasing the effectiveness of the pump strokes from a minimum to a maximum.

The lobes 38 for the fuel pumps are advanced equally gradually from the point $Z^1$ to the point Z, about 15°–35° before the top position of the pistons in the nine cylinders. For the pure Diesel cycle the injection may continue until the piston is over top-dead-center position. In the Hesselman cycle, the fuel is usually injected anywhere from the moment when compression begins, but must end substantially before top dead center is reached, as explained before (see Figs. 5 and 20).

Therefore the quantity and the timing of the fuel injection are retarded and advanced by cam 41 and cam 38 respectively and approximately in equal proportion, approximately from a position of 30° before top center position to a position of 30° after the pistons reach their top position; this timing can be, of course, varied according to the type of engine. It is possible to change said positions to 45° after piston-top position to 15° before said point (or reversely) and the timing of the stroke by cam 38 may be retarded and advanced in a ratio differing from the variation of the effective stroke of the fuel pumps by cam 41, by making the lobes 41 with a sharper decline so that a maximum of fuel injection is already reached when the moment of injection is exactly at point a in Fig. 20. It is therefore evident that a wide variation between the timing and the quantity of the fuel injected may be effected, even when both mechanisms are moved by the same lever 16e, connected with two levers numbered 13d and $16c^2$ in Fig. 6.

It is to be noted that the crank-shaft rotates in the drawings counter-clockwise, the cam-shaft 40 rotates therefore clockwise, and the cam-shaft 41 is rotated by lever 16e counter-clockwise when increasing the fuel stroke. Cam-shaft 40 is rotated clockwise when advancing to the point b (see Fig. 20) of beginning of the opening of valve 4 (exhaust period), and point f for the closing of valve 4 approximately (inlet period). When seen from the rear end of the engine as in Figs. 5, 10, 11 and 12, the ring 16c, when rotated clockwise by lever $16c^2$ and bevel gear $16c^1$, rotates the cam-shaft 40 in a clockwise direction as the shafts 17a have their bearing in the ring 16c, and when rotated clockwise, ring 16c takes the shafts 17a along thereby rotating gear-wheels 16 over the gear-wheel 15 of the crank-shaft 14, thereby rotating annular gear 18 located inside camshaft 40 (see Fig. 12) by gear 17 a number of degrees greater than that of ring 16c. The crank-shaft with its connecting rods and pistons offers far more resistance to movement than the camshaft 40, therefore these cam-shafts move with ring 16c in a clockwise direction when ring 16c is rotated clockwise.

This arrangement of the gearing makes it easy to control the effect of the fuel-stroke and fuel-timing and valve-timing all with one lever 16e, as shown in Fig. 6. It is understood, however, that if requirements of existing engines (or dimensions per se) require some other constructions, these details may be easily modified without deviating from the scope of the general arrangement here proposed.

Returning in particular to Fig. 10, the lower tip of the pipe or mouthpiece 29a may be slightly split to give some resiliency for the fit of the annular ring 30a of piston 30 when slipped over 29a. This pipe 29a is made by preference thin in order to retain the same area for the passage of fuel as in pump space above the piston 34, when the piston 30 is moved upwards by cam 41 when decreasing or rather modifying the fuel stroke, that is, the quantity injected. It is understood, however, that this tip may be made heavier than shown.

Two concentric rings or pipes (29a and 29b) are shown on part 29, and two on part 30 (respectively 30a and 30b), in order to retain all the oil above the piston 34 on the fuel stroke. This arrangement gives a quadruple seal, but in most cases a double seal by two concentric rings on the part 29 and one on the auxiliary piston 34 (or reversely) is sufficient. The stroke of piston 34 should come in its lowest position about a length equal to half the distance of the total stroke, below the fuel passage 31, in order to insure sufficient time for the fuel to enter the piston chamber. The bore and stroke of the piston is about $\frac{1}{17}$ to $\frac{1}{23}$ of the bore and stroke of the cylinder-pistons. The bore thereof can be increased, and the stroke decreased, or reversely.

It will be found in general that the variation in timing of the fuel stroke of 60° is sufficient to give a very early beginning of fuel injection at the point Z in Fig. 20, at a very high speed, and a very late injection beginning at $Z^1$ at very low speeds. However, it is well understood that the actual time to ignite the fuel remains substantially constant at all engine speeds. If the engine speed increases, the time per crank-angle-degree-rotation decreases, so that injection has to start earlier. If this variation in itself is not sufficient, the variation of the effective fuel stroke by cam 41 helps to effect the desired effects of early and late injection according to engine speed as cam 41 affects the timing also. If both of said variations are found not satisfactory in a given design, the drive of the cam 38 for the fuel pumps could be separate from the drive of the cam 19b of the cylinder-valves in order to obtain a greater or different variation of timing.

An increase of variation of timing for the nine cams 41 on camshaft or cam ring 41 (see Fig. 12) (said cams and camshaft forming a single unit and therefore given the same number) and four cams 38 on camshaft 40 may be further effected by enlarging the bevel gear 43a, or the bevel gear $16c^1$. The variation of timing of the latter camshaft 40 is bound however within about 60° variation as can be seen from Fig. 20. When the exhaust and inlet period are each about 240°, and the compression and expansion period are about 120°, it is evident that the timing of the camshaft 40 cannot be much more retarded than 60°, otherwise the piston starts its upwards travel before the valve 4 begins to open to exhaust the gases and the pistons would be subject to too much resistance even at low speeds. At high speeds it is not advisable on the other hand to open the exhaust much earlier than 60° before bottom position in order not to lose too much power inherent to the expansion period. The said advance of timing is at the same time sufficient to keep the valve 4 open a sufficient time in order to reject a great part of the mixture-charge, which is preferable for the operation of the engine with gasoline or benzol, which can stand only pressure of about 5–8 atmosphere without pre-ignition or detonation. If the compression-ratio cannot be regulated enough by the throttle 5g or 4g, variation of the timing of valve 4 is imperative for controlling the temperature without throttle 4g and 5g.

Therefore the operation of the engine as an explosive type and as a Diesel type is closely (but not imperatively) related to the mechanism to vary the timing of the fuel stroke and the lifting of the valves 4 (cams 40 and 18 respectively). In an engine with two valves per cylinder, throttles 5g and 4g can be applied, and also the variation of timing, or this variation may be omitted. In the latter type the closing of the inlet valve can be retarded in the same way to effect the lower compression during starting. Like in the arrangement of Figs. 1 and 2 in which a single valve controls the exhaust and inlet, all the inlet valves are connected with a single inlet manifold so that, when the mixture-gases are rejected they are forced back in the manifold and are led to other cylinders having simultaneously an inlet period when the first cylinder has the rejection period and no precious mixture-gas is lost that way. It is therefore evident that the inlet manifolding is an element of the present system to start an injection-engine on the explosive cycle, and that this inlet manifold in the engines with a single exhaust-inlet-valve is equally important in the type of engines with a separate exhaust and inlet valve.

Returning to the first three figures, the cycle of the engine in connection with construction and movement of the valves 4 and 5 will now be discussed in connection with Figs. 20 and 5, and more in detail.

Assuming that the valve 4 is being lifted by the camshaft 40 with the cam 19a (see Fig. 5) at $b^1$, see Fig. 20 when the piston is in bottom center position and continues to point $d$ in Fig. 20 when the exhaust finishes and the piston reaches top position; (as we have seen, we assume that the engine rotates counter-clockwise, and the camshaft clockwise). We see from Figs. 1 and 5 that by preference the valve 4 is lifted initially only about half-way or less by the lower portion 19a of the cam (see Fig. 5), so that the exhaust may start past valve 4, valve 5 being closed by spring 5b, in Figs. 1 and 2 (not Fig. 3). The exhaust gases rushing past the valve 4 keep the valve 5 on its seat (triple) by creating an immediate pressure in chamber 4a, even if spring 5b—b did not hold it there. However, shortly before the end of the exhaust period, before the piston reaches point $d$ in Fig. 20 the cam 19b that is the higher portion of the same cam (see Fig. 5) comes in action and opens the valve 5. When the pressure in chamber 4a begins to decrease towards the end of the exhaust period in chamber 4a, and exhaust pipe 4b, the valve 5 opens before (or about the time) the exhaust period is finished. Supposing that the lever 16e is pushed to the left in Fig. 6 retarding the timing of valves 4, and gasoline being admitted to the carburetor 5h, some of the mixture made thereby may pass the valve 5 into the exhaust manifold before reaching the cylinder, but this loss will not be appreciable when compared with the advantage of heating up the engine in a sure way, with small compression and proper mixture. As soon as the piston begins its downward travel from $d$ in Fig. 20, the mixture streaming from the inlet conduit 5b will exert a definite pressure on the valve 5 held open by the rocking lever 7 (spring 4 and 5b—b being compressed by rocking lever 7). The exhaust gases having acquired a great impetus during a definite and considerable length of time continue to stream in the same direction in conduit 4b, and the mixture streams from which it enters the piston space 2 in a riphery thereof $5^4$ and inner periphery $5^1$) past valve 4, wide open by this time when the piston is in top position, into the combustion space 12, from which it enters the piston space 2 in a whirling motion on account of the form of chamber 12, as explained.

The piston continues its downward travel to point $b^1$ in Fig. 20, and the inlet gases still stream into space 12a until the pressure of the returning piston begins to reject the mixture gases towards chamber 4a from where they will enter for the major part into the exhaust pipe until valve 4 closes rapidly. When the lifting period of valve 4 is about 240° for exhaust and 240° for the inlet period, this valve 4 (and therefore valve 5 a little earlier) will close in the present retarded position about when the piston reaches point $f^1$, rejecting thereby most of the charge and preventing pre-ignition. When the piston reaches about $a$ in Fig. 20, the spark-plug 13a receives a spark, and the mixture is properly ignited as in any explosive engine.

This explosive cycle is repeated until the engine is sufficiently heated up to continue with a Diesel operation. It is understood that the timing for the spark-ignition may be varied as in any explosive engine, but for the purpose required here from this operation, constant ignition is generally sufficient.

When moving the lever 16e of Fig. 6 to the right bringing the timing of the valves 4 in their normal position, the exhaust throttle 4g may be opened entirely, the Diesel fuel may be turned on at 13f (lever 13e) for Diesel operation, the gasoline shut off at 13c, and the cam-shafts 18 and 40 advanced clockwise to the point $b$ from point $b^1$ in Fig. 20, (in Fig. 5 the cam-shaft 40 is rotated clockwise about six to seven and a half degrees, which is equivalent to 48°–60° of crank-shaft rotation). In this Diesel cycle, the exhaust starts therefore early at the point $b$ of Fig. 20 approximately. Valve 4 opens again initially half-way (or even less), and the exhaust gases stream towards conduit 4b. Exhaust to point $d$ continues, inlet starts about at $d$, after the valve 4 and thereby valve 5 is opened further. Pure air passes into inlet manifold at 5i (Fig. 6) and streams past valve 5 and 4 unobstructed into piston chamber 2. The valve 5 closes before the point $f$, approximately at $b^1$, in Fig. 20 when the piston is about on its way up for the compression stroke and some air may rush from chamber 4a in the cylinder space from $b^1$ to $f$ in Fig. 20. Fuel is injected at point Z, which may be anywhere from 30° to 15° before the top position. This Diesel cycle is continued until lever 16e is pushed again entirely to the left, so that the Diesel fuel is discontinued to the pumps 34 (or even to the low pressure pump at 31b in Fig. 12), and the gasoline admitted again near the entrance 5i of the inlet manifold 5f.

These two positions of lever 16e are the extreme ones, but the arrangement of the interlocking mechanism of Fig. 6, may be, as explained, so constructed that the admission of a mixture during the operation on the Otto cycle may be slightly increased, by moving the lever 16e somewhat to the right opening valve 4g without admitting yet the Diesel fuel. At the same time the additional lever 5g, controlling the inlet manifold 5f, may be opened a little more than is necessary for starting purposes to heat the engine up quicker. This movement of the lever 16e to the right is, of course, limited by the degree of compression the Otto-operation-fuel will stand as to richness and quantity. The lever 16e should therefore have a notch indicating the extreme position which is a matter of design. Equally another notch should indicate the position of lever 16e, where the Diesel fuel by lever 13d is admitted.

As already explained in connection with Figs. 10–12, when the lever 13d is turned to the Otto-cycle operation, the piston 34, in the fuel pump (see Fig. 10) cannot create pressure above this piston, as the Diesel fuel is pressed back into the fuel line 31a. However, it is preferred to insert another cut-off in the Diesel fuel line by inserting the cock 13f (see Fig. 6), which may cut off the fuel before it reaches the fuel pumps at 31a (or the low pressure pump 31b) from the main reservoir for Diesel oil.

The cam 41 when moving to the left in Fig. 10 lowering the push-rod-pistons 30c controlling by-pass valve 30 increases not only the quantity, but also advances slightly the timing of fuel injection, as the piston 34 does not begin to create pressure before the fuel passages 31 are covered up. Therefore the lever 13d regulates the timing of Diesel fuel injection just as well as lever 16c² (see Fig. 6), controlling directly by lever 16c² the variation of or timing of the cam-shaft 40 for the same fuel pumps and regulating the effective stroke (by lever 13d) of the pistons 34. Therefore the pistons 34 and pushrod pistons 30c actuating by-pass sleeve-valves 34 both regulate the timing in unison, and about at the same rate, as both of said cam shafts 41 and 40 are rotated at the same rate. Of course, this rate may be constructed differently in any given design, so that the maximum quantity may be reached before the earliest timing is reached or reversely. This feature is of especially great advantage in the construction of a flexible engine, either for operation in the air, or on the land, or on the water, or below the sea-level.

The variation of the timing regulating the compression of this engine by rejection of more or less of the air-charge for Diesel-operation, in addition with means to regulate the quantity of exhaust gases into the fresh charges, by throttle valve 5g, or 4g, or both, makes the present construction very adaptable to various types of engines.

It may not be superfluous to state that the cross-section of the passage controlled by the valve 5 is preferentially about 50° (or more) to 25° greater than that of valve 4, so that plenty of air enters chamber 4a and manifold 4b before and during the actual filling of cylinder 1, thereby insuring full air capacity notwithstanding the fact that valve 5 closes before valve 4. In the arrangement shown in Figs. 1 and 2, it is evident that on account of the two springs, one for each valve, the valve 5 opens later and closes earlier than valve 4. As explained, the earlier closing of valve 5 does not decrease the capacity of the valve 4 as the chamber 4a and pipe 4b are full of air on account of the inertia of the gases streaming away from conduit 5b into chamber 4a and into pipe 4b. The last amount of air will be therefore obtained from chamber 4a and exhaust conduit 4b.

In order to seat valve 5 noiselessly, the cam 19b may be stepped at the end in the same way as at the front end of this cam (see Fig. 10), in order to seat the valve 5 without too much noise.

Now I will discuss the modifications of Fig. 3, Figs. 14–18, Figs. 9, 22, 23, 24 and Fig. 8.

A variation of said valve arrangement of Figs. 1 and 2 is shown in Fig. 3, where the auxiliary or additional valve 5 forms a single reciprocating unit with valve 4. The stem of valve 5 is located between a shoulder 4¹ on the stem of valve 4 and the spring rest 4c of valve 4. Both stems are sliding in the guide 6a¹ of the cup 6a and are guided thereby. The spring rest 4c may slide in an additional guide 6 forming a part of the rocker arm box, if preferred, as in Fig. 1.

When the lower part of the cam 19a initially lifts the valve 4 to the point 19a² in Fig. 3, the valve 5 still covers up the passage 5⁵ between chamber 5a and 4a, the outer periphery of said valve 5 sliding into a short cylindrical chamber 5⁵ between chambers 4a and 5a. As soon as the higher part of the cam 19b comes in action, the valve 5 is lifted below said cylindrical area see position 19b in dotted lines in Fig. 3, and establishes connection between the inlet conduit 5b and the piston space 12a—a, via valve 4. The corresponding positions of the auxiliary valve 5 are indicated by the dotted lines 19a¹ and 19b¹ respectively. In the present arrangement of Fig. 3, the valve 4 can be closed with uniform speed with a cam-end as shown in Fig. 5, which is not stepped as at the forward end of it. The valve 5 closes here also before valve 4, and the last amount of air may be sucked from space 4a and exhaust conduit 4b filled with air for an appreciable length.

In order to prevent ignition of the mixture charge admitted through conduit 5b during the operation of the engine as an explosive type, the periphery of valve 5 should fit into the cylindrical area 5⁵ accurately so that no appreciable amount of hot exhaust gas may reach the mixture above valve 5. This can be machined very accurately, as the cup 6a fits into the cylinder-head and is at the same time providing a guide 6a¹ for both concentric valves 4 and 5. The arrangement of the chambers 4a and 5a and the exhaust and inlet conduits and all other parts remains the same.

The construction of Fig. 3 makes the whole cylinder-head somewhat lower than that of Figs. 1 and 2, and makes the frontal area of the whole engine smaller, and is in this respect preferable over the other construction. The absence of a spring and spring-rest for valve 5 simplifies and lightens further the whole valve construction and simplifies the cam form of the end of cam 19b.

It prevents further any asynchronism between the action of the two valves, as the stem of valve 5 cannot be pinched between the stem of valve 4 and the guide 6a¹.

The advantage of the construction of Figs. 1 and 2 lies in the fact that the valve 5 here has an inside and outside passage and the greater volumetric efficiency of valve 5 over the valve 4 in Fig. 3 can be incorporated by increasing the diameter of valve 5 over valve 4, as shown in Fig. 3.

In Fig. 3 the inlet valve 5 has an upstanding rim 5⁶ to increase considerably the capacity of the flow of the charge from the inlet conduit 5b to the chamber 4a and cylinder 1. The incline of this rim 5⁶ may be increased or decreased to suit the particular construction. The center part of said valve may be again provided with openings 5¹ as shown in top view in Fig. 19 for the similar valve 5 of Fig. 1. The form of this valve differs from the so-called tulip type in that the upstanding rim 5⁶ is not curved or concave but is substantially straight and forms a definite angle at both ends with the stem of the valve and the periphery.

The modification of Figs. 14–18 showing a sleeve-valve engine, differs from the type of Figs. 1–3.

In the sleeve-valve type the burned gases are exhausted exclusively into the exhaust conduit 4b for a shorter time than in the type of Figs. 1–3.

In the sleeve-valve type it is preferred to heat up the engine with a benzol mixture (or alcohol mixture) able to withstand a higher temperature before ignition. This is preferred because the exhaust gases are reduced in pressure and temperature a shorter time before the inlet conduit communicates with the cylinder-space than in the poppet-valve type, as will be now discussed in connection with the mechanical details of the sleeve-valve type as follows:

Figs. 14 and 15 show one modification, Fig. 13 shows the first modification and Fig. 16 shows the second modification of Figs. 14 and 15, and Fig. 18 is a diagram explaining the operation of this sleeve in relation with the position of the lower edge 47b¹ (see Fig. 14) of the exhaust port in the sleeve 46. The letters a, d, a¹ left, b left, b¹, b right, a² left and right, and a¹ right refer as well to the piston-positions as to the position of the sleeve (especially edges 47b¹ and 47a¹ thereof). That means the piston makes two full movements, up and down twice, against one full up and down movement of the sleeve. Nevertheless these points indicate substantially corresponding positions of the piston and the sleeve, as follows, in a fourstroke cycle.

In Fig. 18 the letter a indicates the piston in top position (let us assume the upper surface of the piston 2) when firing occurs, at a² left it is halfway down, at b¹ it is in dead center bottom position. At b left the exhaust period begins, and at b right the inlet period ends, and when the piston is at d the cycle of two complete revolutions, or two complete up and down movements of the piston, is completed. These same points correspond to a single down and up movement of the sleeve 46 around said piston 2, as follows:

Likewise the point 47b¹ of the sleeve is at point a when firing occurs. At point a¹ left when exhaust period begins, and at point b¹ when the exhaust period ends and the inlet period begins. At point a¹ right the inlet period finishes, and at point d the cycle is completed, and firing occurs again.

The point 47a¹ on the sleeve attains said positions likewise in the same order with respect to the lower point or level 12b in Fig. 14 (which corresponds with the area 12b of close approximation of piston and undersurface of head in Figs. 1 and 3) and correspondingly later with respect to the lower edge 48 of the inlet pipe 5b in Fig. 14. Correspondingly therewith, therefore, the piston is at a, when edge 47b¹ is also at point a in top position. The piston position b left corresponds with the position a¹ left of said edge 47b¹, when the exhaust period begins.

When said edge is at b¹, the piston is at a again, the end of the exhaust period and beginning of the inlet period.

When said edge is at a¹ right, the piston is at b right, the compression period begins.

When said edge is again in top position at d, the piston is also again at d in top position and firing occurs, and the cycle starts all over in the same way.

Assuming that the engine rotates counter-clockwise in Fig. 18, this edge 47b¹ in Fig. 14, see exhaust port 46b in the cylinder is about at point a¹ when the exhaust period begins at b left in Fig. 18, 60° before bottom position of the corresponding piston, and it is at a² left side of Fig. 18, when the opposite lower edge 47a¹ opens the inlet port 46a at a² left in the cylinder.

The piston reaches bottom position at b¹ during the subsequent inlet stroke, edge 47a¹ covers the upper edge of the cylinder-port 45 in Fig. 14 at a² right in Fig. 18 and edge 47b¹ is still open and is at a² right hand side in Fig. 18. When the edge 47b¹ closes the exhaust port at a¹ right in Fig. 18, the piston is about 60° after bottom position at b left in Fig. 18. When the edge 47b¹ is about at d, top position of the piston at d also, ignition or expansion begins, and this cycle is repeated.

The cylinder-head 44 in Fig. 14 is again pressed on the cylinder-barrel 45 (with cooling ribs 45a, if air-cooled), by means of the platforms or brackets 10b (and 8b) and annular rings 11a and 9a, as shown in the modification of Figs. 23 and 24 to be explained shortly hereafter. The head is provided with internal cooling ribs 44a and Fig. 17 shows a cowling 54 which directs the slip-stream of the propeller towards the inside of said head. The central part of the head is provided with a cup 50, forming the combustion chamber proper, and a central fuel injector 13b, and a spark-plug 13a are screwed into the top of said cup. The piston 2 has a central elevation 51 provided with spiral grooves 52 having axes tangential to the central part of said displacer 51 in order to cause a swirling motion in the air-charge, when the piston during the last stages of the compression stroke forces the air-charge into the cup 50 from the annular space or chamber 12b, between the piston and the under-surface of the head 44. The height of this central elevation may be increased, so that it enters chamber 50 much earlier. This arrangement has another important feature. The height of the entrance of said tangential slits 52 is diminished when said displacer 51 enters the chamber 50 sunk in the cylinderhead 44. Therefore the air is squeezed at an increasing speed from between the space 12b between piston and cylinderhead into the chamber 50 because the passage is gradually cut off. This is very important because the fuel injection starts at high speed considerably before the piston reaches top position in the high compression type engine, and upon burning of the fuel the pressure increases in chamber 50 and retards the speed of the air rushing into said chamber through the slits 52 with the subsequent result that if this speed was not increased during the last stages of upward travel of the piston, the turbulence would subside in chamber 50. A sleeve-valve 46, inside said cylinder 45 and sliding at the top end between said cylinder-head 44 and cylinder 45, said cylinder-head 44, provided with compression rings at 49, and said sleeve is provided with inlet ports 47a to the left, and exhaust ports 47b to the right, communicating respectively with inlet port 46a in the cylinder and with the inlet conduit 5b and with the exhaust port 46 in the cylinder and with exhaust conduit 4b.

In one modification of Figs. 14 and 15 the inlet conduit 5b and cylinder 45 (and cylinder-wall 45) has a port 46a having a height smaller than that of the opposite exhaust port 46b in the cylinder 45, while the exhaust conduit 4b (and cylinder-wall 45) has a port 46b substantially equal to the exhaust port 47b in the sleeve.

Supposing that the sleeve descends during the expansion period from the approximate point $a$ in Fig. 18, to the point $a^1$, rotating counter-clockwise, the lower edge $47b^1$ of the exhaust port 47b in the sleeve 46 clears the cylinder-head 44 and the upper edge of the exhaust port in the cylinder 45 first, during 60° approximate crank-shaft revolution from $a^1$ to $a^2$ in Fig. 18. Supposing that the exhaust period starts about 60° before bottom center position of the piston 2, at least about ¾ of the burned gases have a chance to escape towards the exhaust conduit 4b without opening the inlet conduit 5b in communication with the cylinder-chamber. When the sleeve descends according to Fig. 18 from $a^2$ to point $b^1$, both ports 46a and 46b are uncovered by the ports 47a and 47b of the sleeve 46. However, the impetus of the burned gases streaming already into conduit 4b, will suck by far the major part of the rest of the burned gases, thrown out now by the upgoing piston during its entire up-stroke during the exhaust period, in the same direction, so that practically no exhaust gases will dart into the inlet conduit 5b connected to a ring manifold as shown in Figs. 4 and 6.

In Fig. 13 is shown a modification of Fig. 14, in which the sleeve at the left side of the cylinder has an inlet port of smaller height than the inlet port in the left side of the cylinder. The height of the exhaust ports in the sleeve and cylinder-wall, and exhaust conduit, are substantially equal.

Fig. 16 shows another modification. The inlet conduit continues into the exhaust conduit. However, between these two sides, the left and right side of sleeve and cylinder-wall, there are a plurality of ports in the cylinder-wall and in the sleeve of which the axes are tangent to the cylinder-bore and directed towards the exhaust side. Equally when the sleeve edge at the end of the expansion period is about at $a^1$ in Fig. 18 (that is point $b$ in Fig. 20), the exhaust port 47b in the sleeve opens up the exhaust port 46b in the cylinder-wall 45 and the tangential ports 47c in the sleeve register at the same time about equal with the corresponding exhaust ports 45c in the cylinder-wall 45. The majority of the exhaust gases will start to stream towards the exhaust conduit 4b and about 60° of crank-shaft rotation further, when the piston starts to go up again on the exhaust stroke, the rest of the gases will continue to stream in the same direction, though the inlet side becomes uncovered also. Equally as in the modification of Fig. 15, when the piston goes down for its inlet stroke, both ports are open from point $a^2$ to point $b^1$ in Fig. 18, and from point $b^1$ to point $a^2$ on the right side, only the exhaust side is open during the last 60° of the inlet period from the point $a^2$ to point $a^1$ right in Fig. 18, when the piston continues to go up again after having reached about bottom position during the end of the inlet period. In both constructions of Figs. 15 and 16 air from the inlet conduit 5b has entered the exhaust conduit 4b during the latter end of the exhaust period (and inlet), and filled the upper part of it, so that the air may continue to fill up the cylinder from the exhaust side by its inertia the exhaust side closing later than the inlet side. In this respect the construction of Fig. 16 is more favorable than that of Fig. 15, as the inlet side continues to be in full communication with the exhaust side, the inlet and exhaust conduit forming a continuous conduit around the cylinder-wall and sleeve, and the air can continue to cool the outside of the sleeve during the compression and expansion period. On the other hand, if no pressure is exerted in the inlet passage 5b of Fig. 15, the construction of Fig. 15 is better as the high exhaust pressure has to pass out initially only towards the exhaust conduit 4b. If pressure is exerted by a blower (as already proposed in said application 447,520) in said inlet manifold, the structure of Fig. 16 has advantages for the Diesel cycle, not for the Otto cycle. Only if the engine has a compressor and is operated on the explosive Otto cycle, in Fig. 16 (and less in Fig. 15) a certain amount of fuel will be lost as the fuel mixing means have to be connected with the inlet or outlet of the blower, and the blower forces the mixture towards the exhaust. During the Diesel cycle the fuel for the explosive cycle is cut off (see Fig. 6) and the injected fuel cannot be blown out because it is injected after the cylinder is closed. Only a certain amount of air will get lost in the exhaust manifold.

Figs. 15 and 16 show further an economic and easily demountable construction for the attachment of these inlet and exhaust conduits to the respective cylinders. In Fig. 15 where the inlet and exhaust conduits do not communicate with each other around the outside of the cylinder-wall and sleeve, they are nevertheless provided with extensions 53 around the entire cylinder, said extensions provided with ears $53^1$, which serve as shoulders for bolts and nuts to tighten the inlet and exhaust conduits around the cylinder.

This latter construction has the great advantage that the cylinder-barrel may be still machined from a single steel barrel together with the cooling ribs 45a, above and below the inlet and exhaust ports in the cylinder-wall. These conduit 53 (5b, 4b) may be of cast iron and may extend downwards further to an inlet and exhaust ring-manifold as shown in Figs. 4 and 6. The similarity between the arrangement of the Figs. 1 and 3 and those of Figs. 14 to 18 is complete, because it is evident that in the two modifications of Figs. 15 and 16, when the single reciprocating valve is open, the passages 5b and 4b form a single common air and exhaust passage. When the valve is closed these passages are temporarily separated, except in the variety of Fig. 16, in which these passages are constantly communicating with each other. In both modifications, however, the piston will draw a charge of air from the exhaust side at the end of the inlet period. In so far each cylinder has a common inlet-exhaust port.

The operation of the sleeve-valve type engine on the Otto cycle and Diesel cycle alternatively, is not so favorable as in the construction of Figs. 1-3. Of course the final expansion pressure has about 60° crank-shaft rotation to cool off to such a temperature that the rest of the burned gases are not able to ignite the mixture gases in the conduit 5b waiting at the edge of the inlet port 46a (in Fig. 15). For that reason it is preferred to operate the sleeve-valve type during starting and warming up period with benzol having a much higher ignition temperature. This temperature is about double that of average gasoline. Benzol can stand further a higher compression of about 7 or more atmospheres. Alcohol could also be used, but it is not so easy to start an engine from cold with alcohol, unless it is mixed with gasoline. Still other fuels exist like amyl nitrate or ethyl ether.

Returning to Fig. 9, which shows a horizontal section of the inlet passage of the modification of Figs. 1 and 2 on the section line S9—S9. It shows further an arrangement to stabilize and fix the cylinders on the cylinder casing 20a of Fig. 12, without the use of bolts between the foot of the cylinders and said casing, and without bolts and nuts between the cylinders and the cylinder-heads. I propose to use circular bands 11 (in sectional parts to be drawn together by turnbuckles 25 as shown in Fig. 4 in front view) resting upon platforms 10, which rest again upon the lower flange of the cylinder-heads. However, in so far these details shown in Figs. 9, 22, 23 and 24 are not directly connected with the subject matter to be claimed in this application, the further description thereof is omitted, but will be presented in a separate application.

In Fig. 23 is shown the general location of the inlet conduits 5b extending towards the front of the engine, and the exhaust conduits extending towards the rear of the engine, both sets of conduits connected with a ring manifold in front and rear of the engine as shown and explained for Figs. 6 (and 4).

Fig. 24 shows a side view of these inlet and exhaust conduits and the location of the rocker arm housing on top of the inlet conduit. The arrangement of the circular bands 11a shows in vertical cross-section, together with Fig. 23, a construction differing from that of Fig. 9.

Fig. 8 shows a modification of the mechanism to effect the retardation and advance of the timing. The planetary gears 16 are again located in a disc 16c which has a straight gear on its periphery.

With this gear (part of a circle is sufficient) is meshed a pinion 16c—c operated by an arm connected again with the link-rod 16d, discussed in connection with Fig. 6. The operation remains identical and this modification is merely shown as an example that various modifications can be made without transgressing the scope of this application.

Finally, it may not be superfluous to point out that when separate exhaust and inlet valves are used, the operation alternatively on the Otto and Diesel cycle has this advantage that no fuel-air mixture can get lost via the exhaust, as in retarded position of the timing the exhaust valve closes after top center position is reached, and the amount of air-mixture rejected through the inlet valve, retarded in timing, is absorbed readily by one of the other cylinders having the inlet period about simultaneously. Especially is this the case in engines in which the said lost-motion-mechanism in Fig. 21 is incorporated, in which case a lean mixture is admitted to the cylinders during the Diesel cycle also, at least during those periods in which the lever 16e has not yet reached the extreme right position. In the types of Figs. 1 and 2, Fig. 3, and Figs. 14 to 18, a certain amount fuel-air-mixture would get lost through the exhaust, especially if a blower is used in addition (as explained). It is considered further important to connect the inlet side of each valve of each cylinder to a single manifolding having a single inlet and to connect the outlet side of each valve of each cylinder to a single exhaust manifolding having a single outlet as shown and described in Figs. 4 and 6. The impetus and momentum of the burned gases exert a pulling action on the charges travelling in the single inlet manifold.

I claim:

1. In a fourstroke cycle internal combustion engine, the combination of a cylinder having a valve in the head thereof arranged at one side of the cylinder and a Venturi shaped passage around said valve so that said valve is located substantially at the narrowest part of said Venturi passage the widest passage of said Venturi shaped passage being located above the narrowest part thereof so that the distance between the widest and narrowest part is substantially at least half the diameter of said valve said engine being of the compression ignition type in which said cylinder is provided below said valve with a deflecting wall extending around a part of the periphery of said valve said wall being concave and curved towards the exit part of said deflecting wall to impart to the aircharge accelerated through said Venturi passage a high rotational velocity, and a fuel nozzle arranged to direct the fuel within said cylinder transversely of the rotating mass an inlet conduit leading to said Venturi passage, the approach of said inlet conduit being tangentially to said cylinder and being substantially above said deflecting concave wall.

2. In a fourstroke cycle internal combustion engine, the combination of a cylinder having an inlet valve arranged eccentrically of the cylinder, said valve being located substantially at the narrowest end of a Venturi passage, and the widest part of said passage being substantially removed from said narrowest part, so that all of the gas passing into said Venturi passage impinges upon the conical surface of said Venturi passage tending to speed up the speed of the gases entering said cylinder through said valve and passage an inlet conduit leading to said Venturi passage, the approach of said inlet conduit being tangentially to said cylinder and being substantially above said deflecting concave wall.

3. In a fourstroke cycle internal combustion engine, the combination of an inlet conduit associated with a cylinder to charge said cylinder, an enlargement in said inlet conduit in the form of a Venturi passage therein, an inlet valve being located substantially at the narrowest place in said Venturi passage in order to accelerate the speed of the gases at said specific point where said valve is located and the gases flowing from said inlet conduit through another valve passing into said Venturi passage at the widest part thereof, said narrowest and widest places in said passage being substantially removed from each other an inlet conduit leading to said Venturi passage, the approach of said inlet conduit being tangentially to said cylinder and being substantially above said deflecting concave wall.

4. In a valve-in-head motor, a cylinder, an inverted inlet valve in the undersurface of a cylinderhead closing said cylinder, a recess in said undersurface around said valve, said recess having a concave deflecting wall to deflect the incoming charge from said valve through an open end of said recess in a whirling motion to create a turbulence in said charge said concavity being so formed that the upper surface of said valve, when open, deflects the incoming charge into said cavity, and said cavity deflecting said charge tangentially into the said cylinder, and around the edge of said valve an inlet conduit leading to said inlet valve, the approach of said inlet conduit being substantially above said deflecting, concave wall, and being further tangential to said cylinder.

5. In a valve-in-head internal combustion engine, a cylinderhead, a cylinder closed by said head, a piston in said cylinder, an inlet valve in a recess in the undersurface of said head, said recess being provided with a deflecting wall curved inwardly over a substantial portion of said recess to prevent the incoming charge from entering the cylinder perpendicularly downwardly but to throw the incoming gases around the edge of said valve in open position towards the open end of said recess so that the charge is thrown into a rotational whirl around the cylinder, said piston approaching the rest of the undersurface of said head closely, and ignition means in said recess closely located to said valve an inlet conduit leading to said inlet valve, the approach of said inlet conduit being substantially above said deflecting, concave wall, and being further tangential to said cylinder.

6. In a compression ignition engine of the overhead-valve type, an inlet valve in the undersurface of said head in a recess thereof, said recess having an open end and a charge deflecting closed end, said latter end being concave to deflect the incoming charge towards said open end so that the charge receives a rotational movement around the axis of the cylinder, and a fuel injector in said recess an inlet conduit leading to said inlet valve, the approach of said inlet conduit being substantially above said deflecting, concave wall, and being further tangential to said cylinder.

7. In a compression ignition internal combustion engine, a cylinder, a piston therein, a cylinderhead, said piston approaching the undersurface of said head closely over a substantial part thereof with the exception of a recess therein, an inlet-exhaust valve therein, said recess having a spiral form, the closed end of which has a concave deflecting rim to throw the incoming charge around the lower edge of said valve in open position towards the open spiral end of said recess, and a fuel injector in said recess an inlet conduit leading to said inlet valve, the approach of said inlet conduit being substantially above said deflecting, concave wall, and being further tangential to said cylinder.

8. In an internal combustion engine of the fourstroke cycle type, having a cylinder and a single port controlled by a valve-structure, said valve-structure operated by one lever, an inlet passage and an exhaust passage associated with said valve-structure, said inlet passage providing all of the aircharge to said cylinder, said valve structure establishing first communication between said cylinder and exhaust passage, then communication between said cylinder and both of said conduits, as well as between said conduits, and finally communication only between cylinder and exhaust passage, and finally closing all communication between cylinder and conduits.

9. In an internal combustion engine of the fourstroke cycle type, a cylinder closed by a cylinderhead, having a single port controlled by a single main valve, said valve located in a recess of the undersurface of said head, said recess forming a combustion chamber, said recess having a portion forming a deflector to deflect the charge into the cylinder in whirling motion downwardly into the cylinder during the inlet period and an inlet conduit approaching said cylinder tangentially, said main valve located therein eccentrically, the said deflecting portion being located substantially under the approach of said inlet conduit to said cylinder.

10. In an internal combustion engine of the fourstroke cycle type, a cylinder having a port controlled by an inlet valve, said valve located in a recess of the undersurface of a cylinderhead closing said cylinder, said recess forming a chamber having a portion forming a deflector to deflect the incoming charge in a swirling motion downwardly into the cylinder, and an inlet conduit approaching said cylinder tangentially, said main valve located therein eccentrically, the said deflecting portion being located substantially under the approach of said inlet conduit to said cylinder.

11. The combination in an internal combustion engine of a cylinder, a piston reciprocating therein, a valve-structure establishing communication between said cylinder and two conduits, said structure having two valves, one below the other, the lower valve cutting the cylinder off from the exhaust and inlet conduit, and the upper valve cutting off the exhaust conduit from the inlet conduit and reversely, said upper valve admitting a charge not only to the cylinder but also to said exhaust conduit when said structure establishes communication between cylinder and both conduits, said valve structure establishing communication first between said cylinder and an exhaust conduit, next between the cylinder and the exhaust conduit and inlet conduit, next between said cylinder and said exhaust conduit only, said valve structure being further so arranged that said inlet and exhaust conduit communicate with each other through said valve structure part of the time when said cylinder communicates with both of said conduits, so that a charge from said inlet conduit may enter said exhaust conduit and from the exhaust conduit into the cylinder during said last period.

12. In an internal combustion engine, a cylinder, a piston reciprocating therein, a valve structure in the top of said cylinder, which consists of two separate valves, elastic means for each valve to close it, a single cam to operate both of said valves, an exhaust valve to open and close the exhaust conduit to the cylinder, and an inlet valve to open and close the inlet conduit to said exhaust conduit, said latter valve having a hollow stem surrounding the stem of the said exhaust valve, a passage in said inlet valve around said hollow stem and the periphery thereof, and a seat for said inlet valve to close said latter passage in said inlet valve when said said valve is seated thereon, said valve structure opening, when the piston is approaching bottom position, the exhaust conduit to said cylinder, opening subsequently the exhaust and inlet conduit to said cylinder and establishing at the same time communication between exhaust and inlet conduit, so that a charge from said inlet conduit may enter said exhaust conduit, closing substantially the inlet conduit to said cylinder and closing substantially thereafter the exhaust conduit to said cylinder.

13. In an internal combustion engine, a cylinder, a piston reciprocating therein, a valve structure in the top of said cylinder, an exhaust and an inlet conduit connected with said valve structure and controlled thereby, said valve structure consisting of two valves, mounted on the same stem, an exhaust-inlet valve mounted at the lower end thereof, an inlet valve intermediate the ends of said valve, said latter valve mounted in a passage of the upper end of said cylinder, so that the said inlet valve clears said passage when said valve stem and valves establish communication between said cylinder and said exhaust and inlet conduits, so that a charge may pass from said inlet conduit not only into said cylinder but also into said exhaust conduit, said valve structure opening, when the piston is approaching bottom position, the exhaust conduit to said cylinder, opening subsequently the exhaust and inlet conduit to said cylinder, closing subsequently the inlet conduit to said cylinder and closing substantially thereafter the exhaust conduit to said cylinder.

14. The combination of claim 12 in a multi-cylinder engine, in which each exhaust conduit of each cylinder is connected with a single common exhaust conduit, and each inlet conduit with a single common inlet conduit, means to throttle either one of said conduits independently of the other.

JEAN A. H. BARKEIJ.

DISCLAIMER 2,191,745.—*Jean A. H. Barkeij*, Altadena, Calif. INTERNAL COMBUSTION ENGINE. Patent dated February 27, 1940. Disclaimer filed May 9, 1940, by the inventor.

Hereby enters this disclaimer to that part of the claim in said specification which is in the following words, Claim 2, lines 14 and 15 thereof,—and being substantially above said deflecting concave wall.

Claim 3, lines 16 and 17,—and being substantially above said deflecting concave wall.

[*Official Gazette June 4, 1940.*]